United States Patent
Hernandez, III

(10) Patent No.: US 6,668,368 B1
(45) Date of Patent: Dec. 23, 2003

(54) VARIABLE-EXTRACTING COMMAND LINE GENERATOR

(75) Inventor: Gaspar Hernandez, III, Andover, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/407,877

(22) Filed: Sep. 29, 1999

(51) Int. Cl.[7] .......................... G06F 9/44; G06F 15/163
(52) U.S. Cl. ........................................ 717/115; 709/311
(58) Field of Search .............................. 717/115, 120; 379/10.03, 27.04, 266.07; 709/311, 320; 345/704

(56) References Cited

U.S. PATENT DOCUMENTS

| | | | | |
|---|---|---|---|---|
| 5,761,272 A | * | 6/1998 | Williams et al. ............... | 379/10 |
| 5,850,511 A | * | 12/1998 | Stoecker et al. ............... | 714/38 |
| 5,923,867 A | * | 7/1999 | Hand .......................... | 703/14 |
| 5,937,041 A | * | 8/1999 | Cardillo, IV et al. .... | 379/93.25 |
| 5,940,620 A | * | 8/1999 | Graham ....................... | 717/158 |
| 6,113,651 A | * | 9/2000 | Sakai et al. .................. | 717/154 |
| 6,141,660 A | * | 10/2000 | Bach et al. ............. | 707/103 R |

* cited by examiner

Primary Examiner—Hoang-Vu Antony Nguyen-Ba

(57) ABSTRACT

A technology to automatically generate a command line that has values for undefined variables in the script appended as arguments to the name of the script. This technology is intended for an unsophisticated user that is unlikely to remember or know the undefined variables within a script and/or the format and order that the values for the variables must be presented as arguments appended to the name of the script. The technology will determine the undefined variables within the script and prompt the user to supply values for the variables, then the technology will automatically generate the command line on behalf of the user and provide it to a corresponding scripting-language interpreter.

14 Claims, 4 Drawing Sheets

VARIABLE-EXTRACTING COMMAND LINE GENERATOR

FIELD OF THE INVENTION

The invention is directed toward the field of command line execution of scripts, and more particularly to a technology for generating a complete command line needed to execute a script, and even more particularly to technology for prompting a user to supply values for undefined variables in a script and then for generating a complete command line needed to execute that script.

BACKGROUND OF THE INVENTION

A script is a program or sequence of commands that is interpreted or carried out by another program. In contrast, a compiled program is a sequence of commands that has been converted to the machine code of a processor for direct execution by the processor. Generally, scripts are easier and faster to code than a program that is to be compiled.

Scripts are typically executed from a command line. The user types in the name of the script and any arguments that are to be passed to the script. Such arguments often represent undefined variables within the script. An undefined variable is one for which the value is supplied to the script at the time of execution, most typically in the form of an argument appended to the command line.

FIG. 1 is a schematic depiction of command line execution 100 according to the background art. Block 102 represents a total command line being manually generated and input by the user to a scripting-language interpreter 104. Again, the burden is upon the user to remember the undefined variables within a script, as well as the required format by which to submit values for the undefined variables as arguments appended to the command line.

Alternatively, the script can be written to prompt a user to supply all of the undefined variables. But this requires there to be dedicated user interface portions added to the script that greatly complicate and lengthen it. Moreover, such dedicated user interface portions are wasted on a sophisticated user of the script because he will know the undefined variables within the script and will remember what needs to be passed as an argument in the command line, as well as the formats of these arguments. And the dedicated user interface portions slow down execution of the script.

For the sophisticated user, the command line interface is a very flexible tool for executing a script. Also, by putting the burden of remembering and supplying undefined variables as well as other arguments upon the user, rather than as dedicated user-interface portions within the script, the scripts are easier to write, shorter and execute more quickly.

But for the unsophisticated user, command line execution is a source of frustration for some and quite possibly a total barrier for others. Typically, the unsophisticated user is not familiar with undefined variables used by a script. If for some reason the user is aware of these variables, very often the user is unaware of the format in which to supply values for these variables at the command line. As a result, the unsophisticated user must suffer through a series of trials and errors at forming the command line in order to arrive at success. And some of the unsophisticated users never form the command correctly.

SUMMARY OF THE INVENTION

The invention is, in part, a recognition of the problem that many unsophisticated users wish to use scripts that are intended for sophisticated users who are adept at command line execution.

The invention, in part, provides a method (and the corresponding software and apparatus) for generating a command line for a script. Such command line generation prompts the unsophisticated user to submit values for all of the undefined variables in the script and then produces the command line with all necessary values for variables being appended as arguments in the requisite form, as well as any other necessary arguments.

The invention, in part, also provides a method (and the associated software and apparatus) of command line execution of a script, the script including at least one undefined variable the value of which is intended to be supplied by a user as an argument in the command line at the time of executing the script. Such a method comprises: a) providing the script; b) finding instances in the script of the undefined variables for which the values are intended to be supplied by the user as the arguments in the command line; c) prompting the user to input a value for the at least one undefined variable, respectively; and d) generating a complete command line, the complete command line having arguments corresponding to values obtained by the step c).

The invention, in part, also provides a method (and the corresponding software and apparatus): of command line execution of a script, the script including at least one undefined variable the value of which is intended to be supplied by a user as an argument in the command line at the time of executing the script. Such a method comprises: a) providing the script; b) treating a first line of the script as a text string; c) searching the string for all substrings corresponding to the undefined variables for which the values are intended to be supplied by the user as the arguments in the command line; d) prompting the user to input a value for the corresponding at least one undefined variable, respectively; e) storing the at least one value received from the user in the step d); f) repeating the steps b)–e) for the remaining lines of the script; and g) generating a complete command line for the script that has arguments corresponding to the values stored in the step e).

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
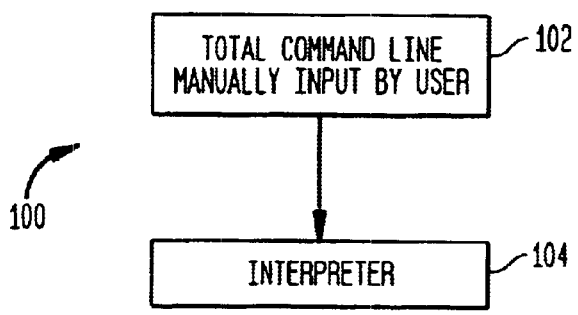
FIG. 1 is a schematic depiction of a command line execution according to the background art.
Figure 2:
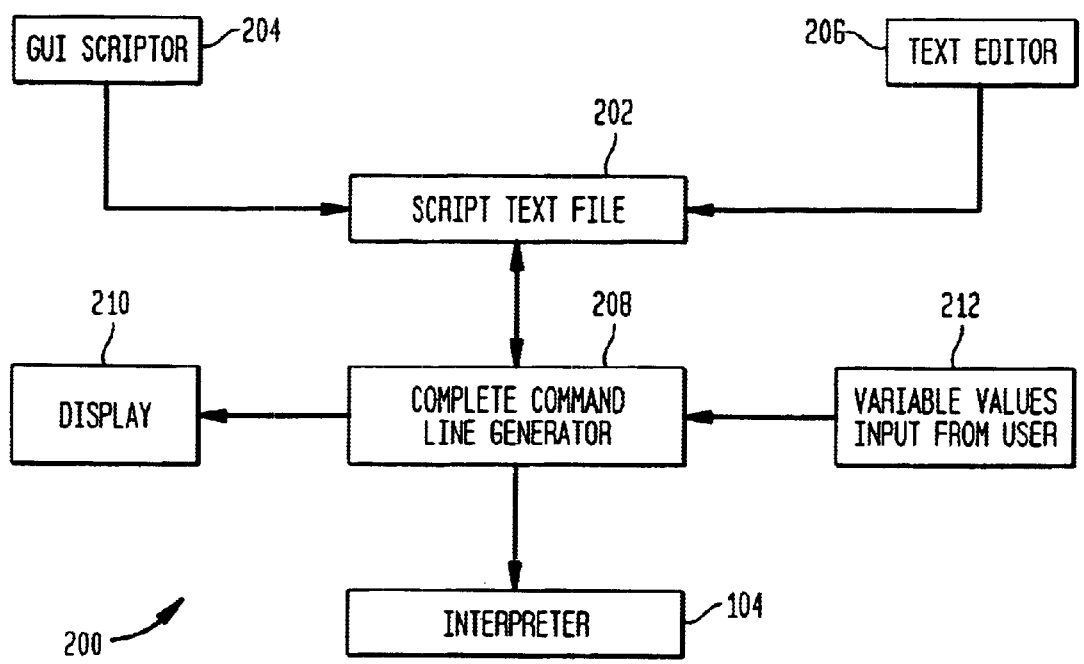
FIG. 2 is a schematic depiction of the command line generator according to the invention.

FIG. 2 is a block diagram embodiment of script line generation 200 according to the invention. Block 202 represents a script. It is to be recalled that a script is a text file. Such a script can be generated by a graphical user interface (GUI) scriptor 204 or by a text editor 206.

Once generated, the script 202 is accessible by the command line generator 208. The command line generator 208 prompts a user to supply values for undefined variables in the script via a display device 210. The user communicates the values for the undefined variables though a manual input device 212. The output of the command line generator 208 is a complete command line that is passed to a script language interpreter 104.

Figure 4:
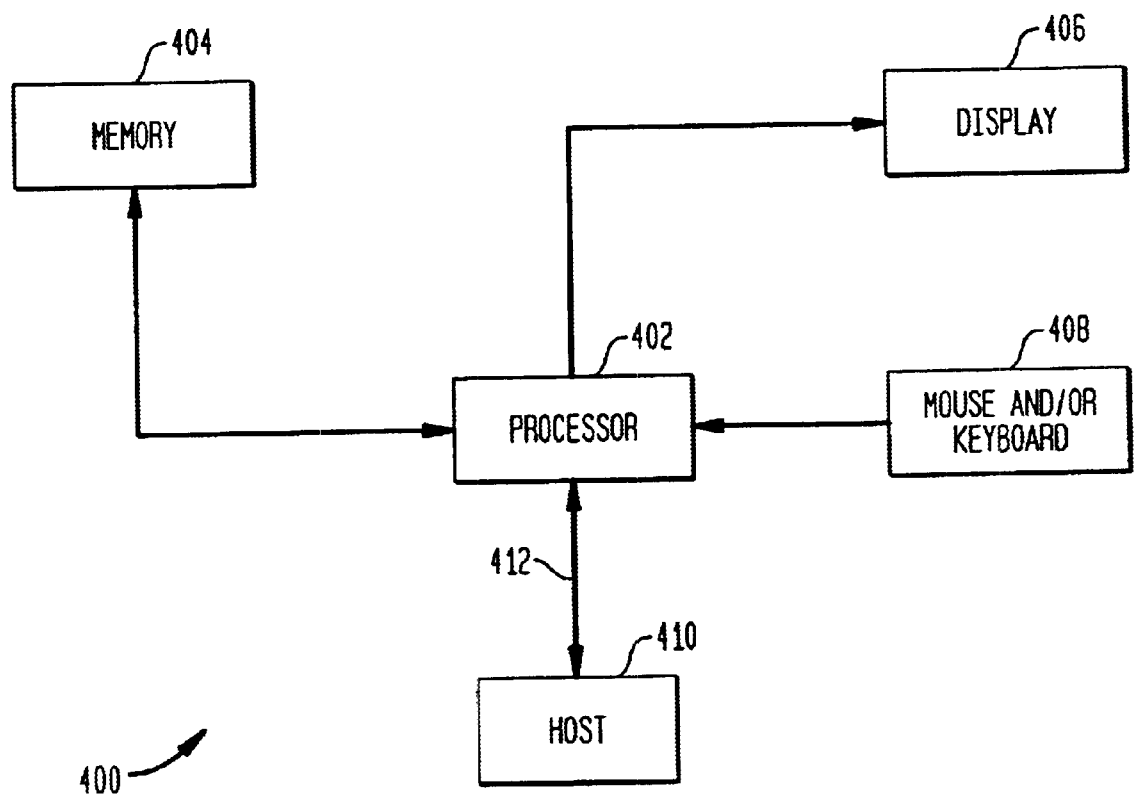
FIG. 4 is a block diagram of hardware to implement command line generation according to the invention.

A command line generator 208 according to the invention is preferably implemented as in the example schematic depiction of FIG. 4, which takes the form of a programmed system 400 that includes a processor 402, a video display device (VDD) 406 (corresponding to item 210 of FIG. 2), a user input device 408 such as a mouse and/or keyboard (corresponding to device 212 of FIG. 2) and a memory device 404. The memory 404 stores one or more programs or scripts that cause the processor 402 to generate the command line generator according to the invention. Embodiments of the invention, for example, have been written using the Tool Command Language (TCL).

The computer-readable memory 404 can include RAM, ROM, a fixed hard disk drive, and/or a removable storage medium for a non-fixed disk drive such as a floppy disk or a CDROM. The program which causes the processor 402 to generate the command line generator according to the invention can be downloaded to the processor 402 from a remote host 410 over an optional connection 412. As the program is downloaded through the optional connection 412, the computer-readable medium in which the program is embodied takes the form of a propagated signal.

Generation of the command line generator according to the invention involves many sorting and comparison operations as well as accesses to look-up tables (LUTs). As such, the processor 404 should be of sufficient processing power to assure reasonably quick results. Examples of adequate processors are those from the Pentium family of processors marketed by Intel Inc.

The processor 402 can execute the program for the interpreter 104 as well as the command line generator 208. In addition, the processor 402 can execute the programs for the GUI scriptor 204 and/or the text editor 206.

The command line generator according to the invention can be tailored to work with a great many languages. It is especially well-suited to the Wireless Automation Manager Interface Language (WAMIL) that is the subject of a first co-pending application.

As its name indicates, the WAMIL is well adapted to wireless technology. A brief discussion of wireless technology will be provided to ensure a proper context for the WAMIL, and thus a proper context for the use of the command line generation technology according to the invention in connection with a WAMIL script.

A wireless communication network is an example of a large system. Large systems often include monitoring systems that permit one or more users to monitor the performance of the system in general, and to specifically monitor the state of one or more parameters of the large system. In some instances, the manner in which the monitoring system delivers information to the user can be a burden.

The wireless communication network provides wireless communications service to a wireless unit that is situated within a geographic region. A Mobile Switching Center (MSC) is responsible for, among other things, establishing and maintaining calls between wireless units and calls between a wireless unit and a wireline unit. As such, the MSC interconnects the wireless units within its geographic region with a public switched telephone network (PSTN). The geographic area serviced by the MSC is divided into spatially distinct areas called "cells." In a schematic block diagram, each cell could be schematically represented by one hexagon in a honeycomb pattern. But, in practice, each cell has an irregular shape that depends on the topography of the terrain surrounding the cell. Typically, each cell contains a base station, which comprises the radios and antennas that the base station uses to communicate with the wireless units in that cell. The base stations also comprise the transmission equipment that the base station uses to communicate with the MSC in the geographic area via communication links. One cell site may sometimes provide coverage for several sectors. Here, cells and sectors are referred to interchangeably.

In a wireless cellular communications system, a base station and a wireless unit communicate voice and/or data over a forward link and a reverse link, wherein the forward link carries communication signals over at least one forward channel from the base station to the wireless unit and the reverse link carries communication signals on at least one reverse channel from the wireless unit to the base station. There are many different schemes for determining how wireless units and base stations communicate in a cellular communications system. For example, wireless communications links between the wireless units and the base stations can be defined according to different radio protocols, including time-division multiple access (TDMA), Frequency Division Multiple Access (FDMA), Code Division Multiple Access (CDMA) and others.

Within the geographic region, the MSC switches a call between base stations in real time as the wireless unit moves between cells, referred to as a handoff. Currently, in FDMA, TDMA, CDMA and GSM, cell site planning to determine the geographic coverage for a cell is a manually intensive task that needs constant adjustment. In planning a cell, the topology of the geographic area and a suitable antenna site is selected based on availability and zoning rules. Such a selection is typically not optimal but adequate. Drive tests and manually collecting signaling data are then performed mostly on the perimeter of the coverage area. Transmit and receive antennas and power are then adjusted in a manually iterative manner to improve the call quality. Sometimes, frequencies are swapped with neighbor cells and/or transmit power is readjusted to improve the coverage. Over time, the cell site engineers review customer complaints and cell site dropped call reports and again try to manually optimize the RF performance.

Lucent Technologies Inc. has developed a monitoring system that a user can use to change parameters of the wireless communication system as well as to extract data about it. This monitoring system can generate the TIpdunix (TI) interface, the Status Display Page (SDP) interface and/or the AUTOPLEX Recent Change & Verification Database (APXRCV) interface. These interfaces can be used individually. But typically, information extracted from one of the interfaces is used to make a decision to use a second one of the interfaces in one way or another. To use an interface, a user must start a discrete process. In a windows-based environment, each interface session has its own window.

A script that relates to wireless technology will typically include variables representative of parameters for a wireless communications network. A few of the many examples of such variables are MSC (for mobile switching center), CELL (for the cell number), ANT (for antenna), CAT (for clock and tone board number variable), CCC (for CDMA cluster controller number), CCU (for CDMA channel unit number) and CE (for channel element number).

The WAMIL language includes commands, if-construct elements and while-construct elements. A WAMIL command has the format of "interface:command," e.g., "TI:OP-:CELL ARGUMENT," "WAM:CONNECT SDP," or "WAM:GETSDP." In other words, a WAMIL command has a first field that identifies an interface and a second field that identifies a command. The first field actually identifies the interface in which the command of the second field is valid. Preferably, the first field precedes, or is a header for, the second field and is separated by an alphanumeric character such as a colon.

Details of the WAMIL language are contained in the first co-pending U.S. patent application, entitled "Multiple Interface Scripting Language," by the same inventor, Gaspar Hernandez, III, filed on the same date, Sep. 29, 1999 that is assigned to the same assignee, Lucent Technologies Inc. The entire contents of this first co-pending application are hereby incorporated by reference.

One of the commands listed in the first copending application is the "GETSDP" command. Details of this command can be found in a second copending U.S. patent application, entitled "Technology to Translate Non-Text Display Generation Data Representing An Indicator Into Text Variables," by the same inventor, Gaspar Hernandez, III, filed on the same date, Sep. 29, 1999, that is assigned to the same assignee, Lucent Technologies Inc. The entire contents of this second copending application are hereby incorporated by reference.

Details of a preferred context in which to use scripts written in the WAMIL language are contained in a third co-pending application, entitled "Liaison Interface," by the same inventor, Gaspar Hernandez, III, filed on the same date, Sep. 29, 1999 that is assigned to the same assignee, Lucent Technologies Inc. The entire contents of this third co-pending application are hereby incorporated by reference.

Details of a scriptor and interpreter that are well suited to the WAMIL language are contained in a fourth co-pending application, entitled "Scriptor and Interpreter," by the same Inventor, Gaspar Hernandez, III, filed on the same date Sep. 29, 1999, that is assigned to the same Assignee, Lucent Technologies Inc. The entire contents of this fourth co-pending application are hereby incorporated by reference.

Figure 3A:
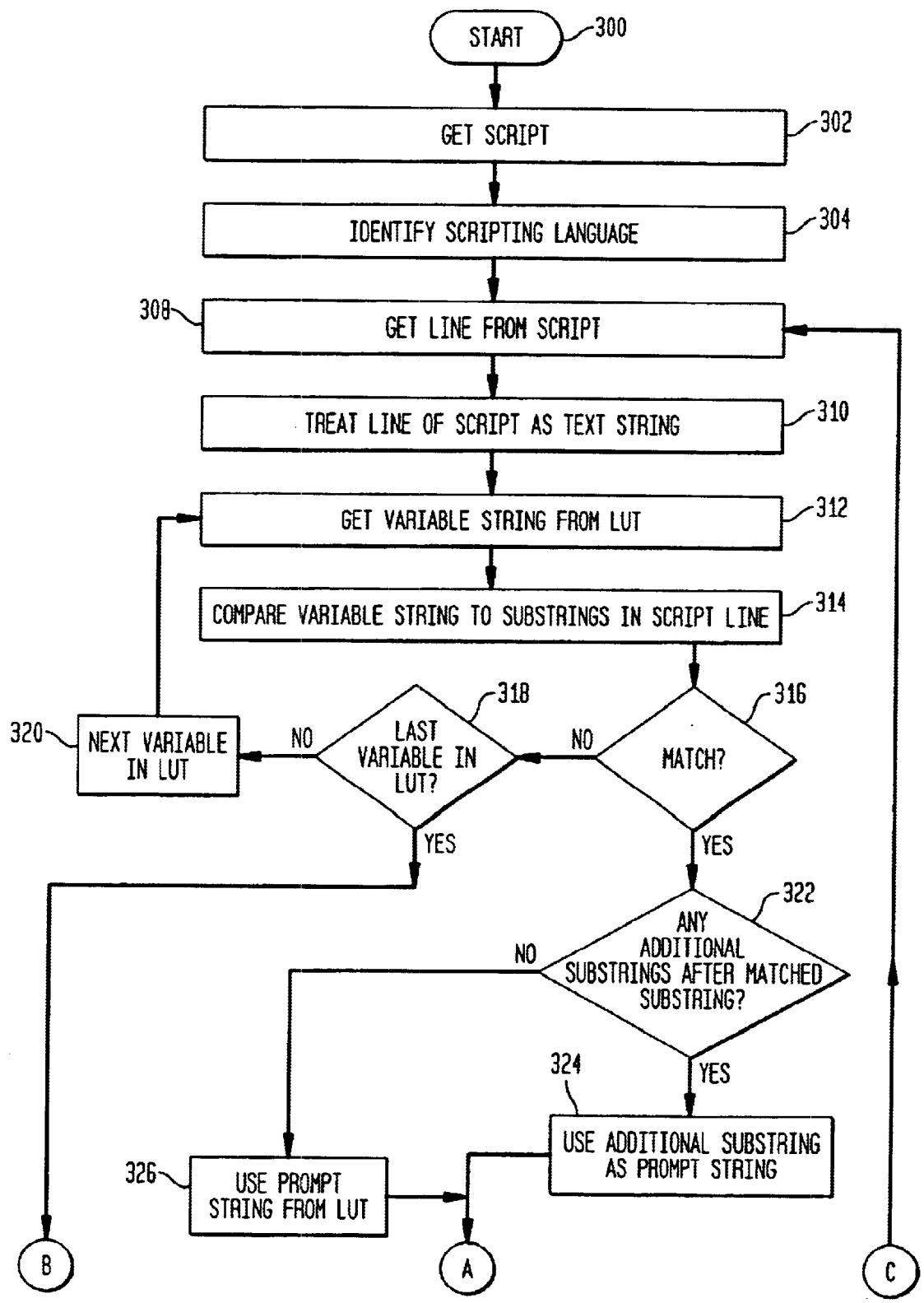
FIGS. 3A and 3B are a flow chart depicting steps of an embodiment of the command line generation according to the invention.
Figure 3B:
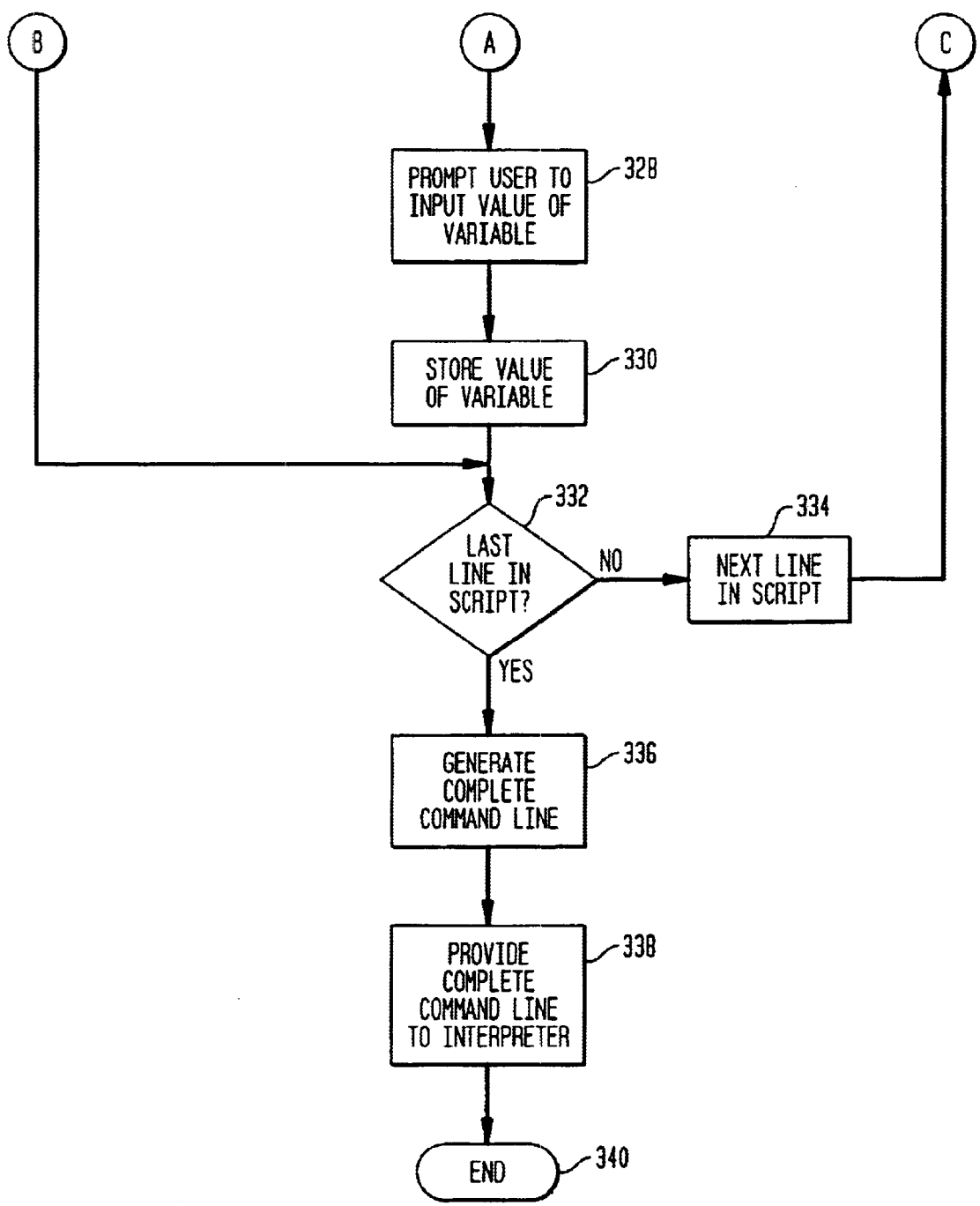

FIGS. 3A and 3B are a flow chart that depict the steps in an embodiment of the command line generation according to the invention. Flow starts at step 300. For example, a user might execute the command generator program from a text-based operating system command line for the processor 402 or by clicking on an icon in a windows-based operating system for the processor 402. In the text-based operating system, the command line generator program 208 will prompt the user for the values of undefined variables by displaying strings of text upon the display device 406. In the windows-based environment the processor 402 will generate dialogue boxes (or windows) to prompt the user for the values of undefined variables.

Once the command line generator program is started at step 300, flow proceeds to step 302, where a script is provided. In the text-based environment, the name of the script can be provided as an argument to command line. In the windows-based environment, the user can click on the name of program as it appears within a list.

Once the script has been provided, flow proceeds to step 304, where the scripting language is identified. A requirement of the command line generator is that the script have a text string embedded in it that identifies the scripting language. Preferably, this identifier is embedded at the beginning of the script in the form of a non-executable comment. Also preferably, the name of the script should have an extension that identifies the scripting language, e.g., a korn shell script would have an extension .ksh such as script.ksh For all scripting languages supported by the command line generator, there is a scripting language look-up table (LUT) in the memory 404 that lists all such scripting languages. The memory 404 also has a look-up table that includes all variables for all of the scripting languages. The command line generator should first determine the scripting language identity for proper command execution.

In step 306, the processor 402 takes the first line of the script under consideration and the first line of the scripting language look-up table and determines whether the language is supported. Preferably, the processor 402 first compares the extension of the filename against entries in the scripting language LUT. Then, if necessary, the processor 402 compares the text substring(s) in the first line of the script against the entries in the scripting language LUT. The processor 402 conducts this comparison process until a match is found or until all of the entries in the scripting language look-up table are exhausted. If exhausted, then the processor 402 returns an error prompt indicating that the script is written in a language that is not supported by the command line generator.

But if a match is found, i.e., if the script language is identified in step 304, then the processor 402 uses the variables look-up table that has the variables for all of the scripting languages.

Flow in FIG. 3A proceeds from step 304 to step 308 where the processor 402 obtains the current (here, the next) line in the script. At succeeding step 310, the processor 402 treats the script line under consideration as a text string. At step 312, the processor 402 accesses the variables look-up table in the memory 404 to retrieve the first variable string. At succeeding step 314, the processor 402 compares the variable string against the substrings in the script line under consideration.

At succeeding decision step 316, it is determined if there is a match. If not, flow proceeds to decision step 318, where it is determined if the current variable is the last variable in the look-up table. If not, then the processor 402 sets the next variable in the look-up table to be the current variable at step 320. Flow proceeds from step 320 back to step 312 where the current variable, i.e., the next variable, is retrieved.

But if a match is found at step 316, flow proceeds to decision step 32 where the processor 402 determines if there are any substrings that follow the substring that matched the command string. If not, then the processor 402 will prompt the user by using a text string from the look-up table that is indexed to the current variable. But if there are substrings in the script line after the matching substring, then flow proceeds to step 324, where the processor 402 prompts the user to input a value for the undefined variable by using these additional substrings of the script line as the prompt string displayed to the user.

Flow proceeds from each of steps 324 and 326 of FIG. 3A to step 328 of FIG. 3B. At step 328, the processor 402 prompts the user using the text strings determined by either of steps 324 or 326. At succeeding step 330, the processor 402 stores the value for the variable that has been input by the user via the manual input device 408, e.g., a mouse and/or a keyboard.

Flow proceeds from step 330 to decision step 332. At step 332 of FIG. 3B, it is determined whether the current line of the script under consideration is the last line in the script. If not, then the processor 402 sets the next line in the script at step 334 to be the current line. Flow proceeds from step 334 to step 308, where the processor 402 retrieves the current next line in the script. But, if step 332 determines that the line under consideration is the last line of the script, then flow proceeds to step 336.

At step 336, the processor 402 retrieves the values for the undefined variables that have been stored in step 330 and generates the complete command line using the values as appended arguments. In doing so, the processor 402 will place the values for the variables into the proper argument format required by the command line. Preferably, the processor 402 will append the arguments in the order in which the undefined variables appear in the script.

Flow proceeds from step 336 to step 338, where the processor 402 provides the complete command line to the interpreter 104. From step 338, flow proceeds to the end step 340.

At step 318, if it is determined that the current variable is the last variable in the look-up table, then flow proceeds to step 332 of FIG. 3B. If no corresponding variable is found for a line of the script, then it is assumed that this is a line which does include an undefined variable.

Some examples of command line generation will now be discussed relative to some example scripts.

A first example script is written in the UNIX korn shell scripting language.

Script No. 1

| Line | Command |
|------|---------|
| 01 | #!/bin/ksh |
| 02 | # ACCOUNT |
| 03 | # CUSTOMER |
| 04 | exec xterm -title"$2"-e account_viewer $1 & |

Lines 1–3 of Script No. 1 are non-executable comment lines. Line No. 1 contains the text string identifier of the korn shell programming language, namely KSH, that is sought by step 304 of FIG. 3A. Line 2 is a comment line that identifies the undefined variable ACCOUNT recited in line 4. Similarly, line 3 identifies the undefined variable CUSTOMER that is also recited in line 4. Neither of line 2 and 3 has a text string following the variable-identifier text string. Consequently, step 326 of FIG. 3A, rather than step 324, will be used by the processor 402 to prompt the user to input values for the variables. An example of the look-up table accessed by the step 326 is presented below.

In line 4, the text string "exec" represents the command to execute the appended argument, namely the text string "xterm." But xterm is itself an x-windows command to open a window named according to the customer. The text string "-title" is a switch option that causes the window to be titled. The text string "$2" is an undefined variable representing the name to be used in the title of the window. The text string "-e" is a switch that causes a program (identified by a following argument) to be executed within the window. The text string "account_viewer" is the name of the program to be executed within the window. The text string "$1" is the undefined variable representing the account to be viewed by the program account_viewer. The text string "&" denotes execution in the background.

The command in line 4 is really a command nested within a command. The UNIX korn shell parses a command line beginning with the most inwardly nested commands and work outward. As such, the first undefined variable encountered by the UNIX korn shell is the variable $1, which, represents the account to be viewed. As such, the variable identifier ACCOUNT appears in line 2 before of the variable identifier CUSTOMER in line 3. The second undefined variable encountered by the UNIX korn shell is $2, which identifies the name of the customer that will appear in the window. Thus, the variable identifier CUSTOMER appears in line 3 as the second undefined variable.

A sophisticated user of the script account_viewer.ksh, i.e., Script No. 1, should be able to manually form the command line that will pass the variable needed by line 4 of the script. But an unsophisticated user will be confounded and will probably fail to correctly type in he command line.

A second example script is written in the Tool Command Language (TCL) scripting language.

Script No. 2

| Line | Command |
|------|---------|
| 01 | #! /apxtools/tcl/bin/expect5.25 |
| 02 | # RECIPIENTS |
| 03 | # FILENAME Please Enter Name Of File To be Sent |
| 04 | # SUBJECT Please Enter The Email Subject Manner |
| 05 | set RECIPIENTS [lindex $argv 0] |
| 06 | set FILENAME [lindex $argv 1] |
| 07 | set SUBJECT [lrange $argv 2 end] |
| 08 | set f [open "$RECIPIENTS" r] |
| 09 | while {[gets $fRECP] >= 0} { |
| 10 | if {[send_email $SUBJECT $RECP $FILENAME] < 0} { |
| 11 | puts "WARNING! Recipient $RECP Email Not Sent!" |
| 12 | } |
| 13 | } |
| 14 | close $f |
| 15 | exit 0 |

Line 1 of Script No. 2 includes the text string "tcl" and "expect", either of which identifies the scripting language as TCL. Again, this text string is sought by step 304 of FIG. 3A.

Lines 2–4 of Script No. 2 list the undefined variables that are used. It is noted that lines 3 and 4 include text strings after the variable-identifying text string. As such, the processor 402 will go to step 324 from step 322 and use the succeeding text strings to prompt the user. In contrast, line 2 will cause the processor 402 to go to step 326 from step 322 and make use of the text string in the look-up table, listed below, to prompt the user.

The command line to execute Script No. 2 (which is named "sendmail") would be as follows: sendmail.tcl recipients filename subject-indicating-text. Here, the order of the arguments is very important. If an unsophisticated user could determine the undefined variables, he would probably have to guess at the order in which to append arguments. There are six permutations to the order of the three arguments, i.e., a possibility of six attempts at the command line that would be required of the user. The command line generator according to the invention relieves the user of the burden of having to identify or remember the undefined variables in script as well as the order in which to append the values for the variables as arguments in the command line.

An example follows of a variables look-up table that stores all of the variables of the scripting languages and text strings to be used by either of the example Scripts Nos. 1 and 2 to prompt the user to input a value for a variable.

| Variables Look Up Table (LUT) | |
|---|---|
| Variable Identifier | Prompt String |
| ACCOUNT | Please Enter The Customer Account Number |
| CUSTOMER | Please Enter The Customer's Full Name |
| FILENAME | Please Enter A File Name |
| RECIPIENTS | Please Enter The File Name With The List Of Recipients |
| SUBJECT | Please Enter A Subject Matter |

The command line generator according to the invention is suitable for use with any scripting language for which the set of variables can be predefined. Though the examples above are based upon the UNIX kom shell scripting language and TCL, and though the invention is especially well suited to the Wireless Automation Manager Interface Language (WAMIL) scripting language, as mentioned above, it is also suited to use with other scripting languages.

It is intended that scripts will be written with the command line generator according to the invention in mind. Such scripts will have none-executable lines at the beginning that identify the undefined variables being used. Each such non-executable line will preferably include only one variable identifier text string. But existing scripts can also be modified very easily to insert such non-executable lines at the top of the script. Thus, with little effort, existing scripts can be adapted to be much more user friendly.

To reiterate, an advantage of the command line generator according to the invention is that it relieves the user from having to remember what undefined variables are used within a script as well as the format in which the values for these variables must be present as arguments appended on the command line. As such, the invention deals with scripts that are intended for sophisticated users and makes them available (as a practical matter) to unsophisticated users. In contrast, the background art effectively makes it impossible for the unsophisticated user to use such scripts. Moreover, if the writer of script intends for it to be used by unsophisticated users, the writer no longer has to insert multiple dedicated interface portions into the script. Rather, the writer need only insert comment lines (preferably at he beginning of the script) that identify the undefined variables because he can rely upon the availability of the command line generator according to the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of causing a machine to prepare a command line by which command-line-execution of a script can be initiated, said script including at least one undefined variable the value of which is intended to be supplied by a user as an argument in the command line at the time of executing said script, the machine-implemented method being carried-out prior to execution of said script, the machine-implemented method comprising:

a) providing said script;
   b) finding instances in said script of said undefined variables for which said values are intended to be supplied by said user as said arguments in said command line;
   c) prompting said user to input a value for said at least one undefined variable, respectively; and
   d) generating a complete command line submission of which to the machine would initiate execution of said script, said complete command line having arguments corresponding to values obtained by said step c).

2. The method of claim 1, wherein:
   said step b) includes:
   b1) treating a first line of said script as a text string; and
   b2) searching said text string for all substrings corresponding to said undefined variables;
   said step c) prompts said user to input a value for the corresponding at least one undefined variable found in said step b2), respectively; and
   said method further comprising:
   e) storing the one or more values received from said user in said step c); and
   f) repeating said steps b)–c) and e) for the remaining lines of said script.

3. The method of claim 1, further comprising:
   e) submitting said complete command line to a machine for execution of said script.

4. The method of claim 1, wherein at least one of said undefined variables in said script is representative of a parameter of a wireless communications system.

5. A method of causing a machine to prepare a command line by which command-line-execution of a script can be initiated, said script including at least one undefined variable the value of which is intended to be supplied by a user as an argument in the command line at the time of executing said script, the machine-implemented method being carried-out prior to execution of said script, the machine-implemented method comprising:

a) providing said script;
   b) treating a first line of said script as a text string;
   c) searching said text string for all substrings corresponding to said undefined variables for which said values are intended to be supplied by said user as said arguments in said command line;
   d) prompting said user to input a value for the corresponding at least one undefined variable, respectively;
   e) storing the one or more values received from said user in said step d);
   f) repeating said steps b)–e) for the remaining lines of said script; and
   g) generating a complete command line the submission of which to the machine would initiate execution of said script, said complete command line having arguments corresponding to the values stored in said step e).

6. The method of claim 5, further comprising:
   h) submitting said complete command line to a machine for execution of said script.

7. The method of claim 5, wherein at least one of said undefined variables in said script is representative of a parameter of a wireless communications system.

8. A computer-readable medium having embodied thereon a program to cause the computer to prepare a complete command line by which command-line-execution of a script can be initiated, said script including at least one undefined variable the value of which is intended to be supplied by a user as an argument in the command line at the time of executing said script, the computer-readable-medium-embodied program being executed prior to execution of the script, the computer-readable-medium-embodied program comprising:

a first code segment to provide said script;

a second code segment to find instances in said script of said undefined variables for which said values are intended to be supplied by said user as said arguments in said command line;

a third code segment to prompt said user to input a value for said at least one undefined variable, respectively; and a fourth code segment to generate a complete command line the submission of which to the computer would initiate execution of said script, said complete command line having arguments corresponding to values obtained by said third code segment.

9. The computer-readable-medium-embodied program of claim 8, wherein:

said second code segment includes:

a first code subsegment to treat a first line of said script as a text string; and a second code subsegment to search said text string for all substrings corresponding to said undefined variables;

said third code segment prompts said user to input a value for the corresponding at least one undefined variable found in said second code segment, respectively; and said computer-readable-medium-embodied program further comprising:

a fifth code segment to store the one or more values received from said user via said third code segment; and a sixth code segment to repeat said second and third code segments for the remaining lines of said script.

10. The computer-readable-medium-embodied program of claim 8, further comprising:

a fifth code segment to submit said complete command line to said machine for execution of said script.

11. The computer-readable-medium-embodied program of claim 8, wherein at least one of said undefined variables in said computer-readable-medium-embodied program is representative of a parameter of a wireless communications system.

12. A computer readable medium having embodied thereon a program to cause the computer to prepare a command line by which command-line-execution of a script can be initiated, said script including at least one undefined variable the value of which is intended to be supplied by a user as an argument in the command line at the time of executing said script, the computer-readable-medium-embodied program being executed prior to execution of said script, the computer-readable-medium-embodied program comprising:

a first code segment to treat a first line of said script as a text string;

a second code segment to search said text string for all substrings corresponding to said undefined variables for which said values are intended to be supplied by said user as said arguments in said command line;

a third code segment to prompt said user to input a value for the corresponding at least one undefined variable, respectively;

a fourth code segment to store the one or more values received from said user via said third code segment;

a fifth code segment to repeat said first to fourth code segments for the remaining lines of said script; and a sixth code segment to generate a complete command line the submission of which to the computer would initiate execution of said script, said complete command line having arguments corresponding to the values stored via said fourth code segment.

13. The computer-readable-medium-embodied program of claim 12, further comprising:

a seventh code segment to submit said complete command line to said machine for execution of said text script.

14. The computer-readable-medium-embodied program of claim 12, wherein at least one of said undefined variables in said computer-readable-medium-embodied program is representative of a parameter of a wireless communications system.

\* \* \* \* \*